(12) United States Patent
Chang

(10) Patent No.: US 10,914,663 B2
(45) Date of Patent: Feb. 9, 2021

(54) PLASTOMETER

(71) Applicant: EKTRON TEK CO., LTD., Changhua County (TW)

(72) Inventor: Yau Dong Chang, Changhua County (TW)

(73) Assignee: EKTRON TEK CO., LTD., Changhua County (TW)

( * ) Notice: Subject to any disclaimer, the term of this patent is extended or adjusted under 35 U.S.C. 154(b) by 131 days.

(21) Appl. No.: 16/369,883

(22) Filed: Mar. 29, 2019

(65) Prior Publication Data

US 2020/0309659 A1 Oct. 1, 2020

(51) Int. Cl.
*G01N 3/42* (2006.01)
*G01N 11/14* (2006.01)
*G01N 3/48* (2006.01)

(52) U.S. Cl.
CPC ............... *G01N 11/14* (2013.01); *G01N 3/42* (2013.01); *G01N 3/48* (2013.01)

(58) Field of Classification Search
CPC ............. G01N 3/42; G01N 3/48; G01N 11/14
See application file for complete search history.

(56) References Cited

U.S. PATENT DOCUMENTS

| | | | | | |
|---|---|---|---|---|---|
| 3,457,779 | A | * | 7/1969 | Hahn | G01N 3/08 73/816 |
| 4,111,039 | A | * | 9/1978 | Yamawaki | G01N 3/48 73/81 |
| 5,062,293 | A | * | 11/1991 | Bakirov | G21C 13/087 73/81 |
| 5,571,967 | A | * | 11/1996 | Tanaka | G01N 3/42 340/573.2 |
| 5,708,224 | A | * | 1/1998 | Palcisko | G01N 33/442 73/866 |
| 6,134,954 | A | * | 10/2000 | Suresh | G01N 3/42 702/156 |
| 2011/0030454 | A1 | * | 2/2011 | Laun | G01N 11/14 73/54.28 |
| 2015/0377759 | A1 | * | 12/2015 | Izumo | G01N 11/16 73/54.25 |

* cited by examiner

*Primary Examiner* — Paul M. West
*Assistant Examiner* — Mark A Shabman

(57) ABSTRACT

A plastometer has: a main frame, a driving unit, an electromagnet, a loading dock, a lower mold, an upper mold and a measuring unit the driving unit drives the lifting platform, so the lifting platform makes a stable elevating displacement along the two supporting columns. Then, the electromagnet attracts and controls the loading dock, so the pressure amount to be provided by the loading dock for each test object 80 can be simply obtained, and the measurement operation is actually performed by the measuring unit which can get accurate test results to improve the measurement efficiency of the relevant industry.

5 Claims, 5 Drawing Sheets

PLASTOMETER

BACKGROUND OF INVENTION

Field of Invention

The present invention relates to a measuring structure, and more particularly to a plastometer.

Description of the Related Art

Current hardness measurement of rubber compounds, according to their application and known methods, it is often used by means of a manual measurement method. Among them, in the hand holding hardness measuring instrument, the general operation is to directly contact the measured surface of the measured object at the bottom to obtain the hardness value. However, if the measured object is a measuring surface of the rubber, the hardness value is easily changed due to factors such as the difference in the force of each force and the contact speed, and it is difficult to objectively and finely standard. Therefore, it is desirable to provide a plastometer to mitigate and/or obviate the aforementioned problems.

SUMMARY OF THE INVENTION

An objective of present invention is to provide a plastometer, which is capable of improving the above-mention problems.

In order to achieve the above mentioned objective, a plastometer has: a main frame, a driving unit, an electromagnet, a loading dock, an upper mold, a lower mold and a measuring unit. The main frame has a bottom plate with two supporting columns, and the supporting columns are respectively provided with a positioning plate and a top plate. The supporting columns further respectively have a supporting section for supporting the positioning plate. A lifting platform is disposed between the positioning plate and the top plate and configured to move along the supporting columns driven by the driving unit. The driving unit further comprises two screws, a driving motor, and a transmission belt. The two screws are symmetrically installed through the top plate and the bottom plate of the main frame and connected to the lifting platform. The driving motor is configured to drive the two screws, and the two screws are coupled by the transmission belt for synchronized rotation to lift the lifting platform along the two supporting columns. The electromagnet is secured to a bottom of the lifting platform and moves with the lifting platform. The lifting platform further comprises two L-shaped positioning frames at two sides of the electromagnet. The loading dock is disposed between the top plate and the positioning plate and connected to a connecting column passing through the lifting platform and the electromagnet and mounted with a magnetic member. The magnetic member is limited between the electromagnet and the positioning frame. The loading dock further comprising a vertical shaft with an upper portion extending through the top plate and a lower portion passing through the electromagnet, the magnetic member, and the positioning plate. The top plate and the positioning plate both have a stabilizer, and the two stabilizers limit the vertical shaft, and the vertical shaft is connected to the upper mold. The upper mold further comprises a sensing handle, and the lower mold is mounted on the bottom plate of the main frame corresponding to the upper mold. The measuring unit is mounted on the bottom plate corresponding to the sensing handle and has a measuring rod connected to the sensing handle.

Other objects, advantages, and novel features of invention will become more apparent from the following detailed description when taken in conjunction with the accompanying drawings.

DETAILED DESCRIPTION OF THE PREFERRED EMBODIMENT

Figure 1:
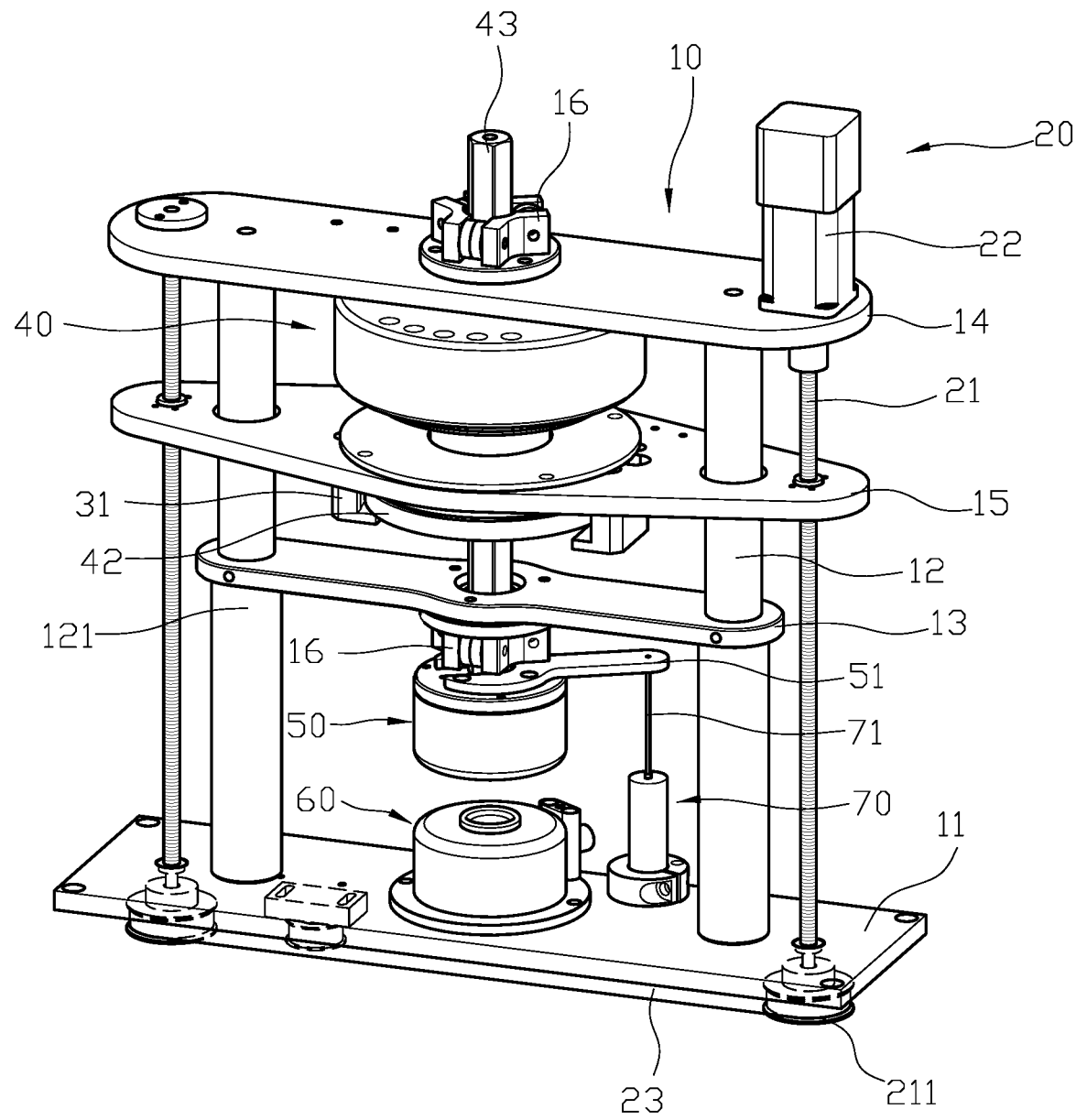
FIG. 1 is a perspective view according to a preferred embodiment of the present invention.
Figure 2:
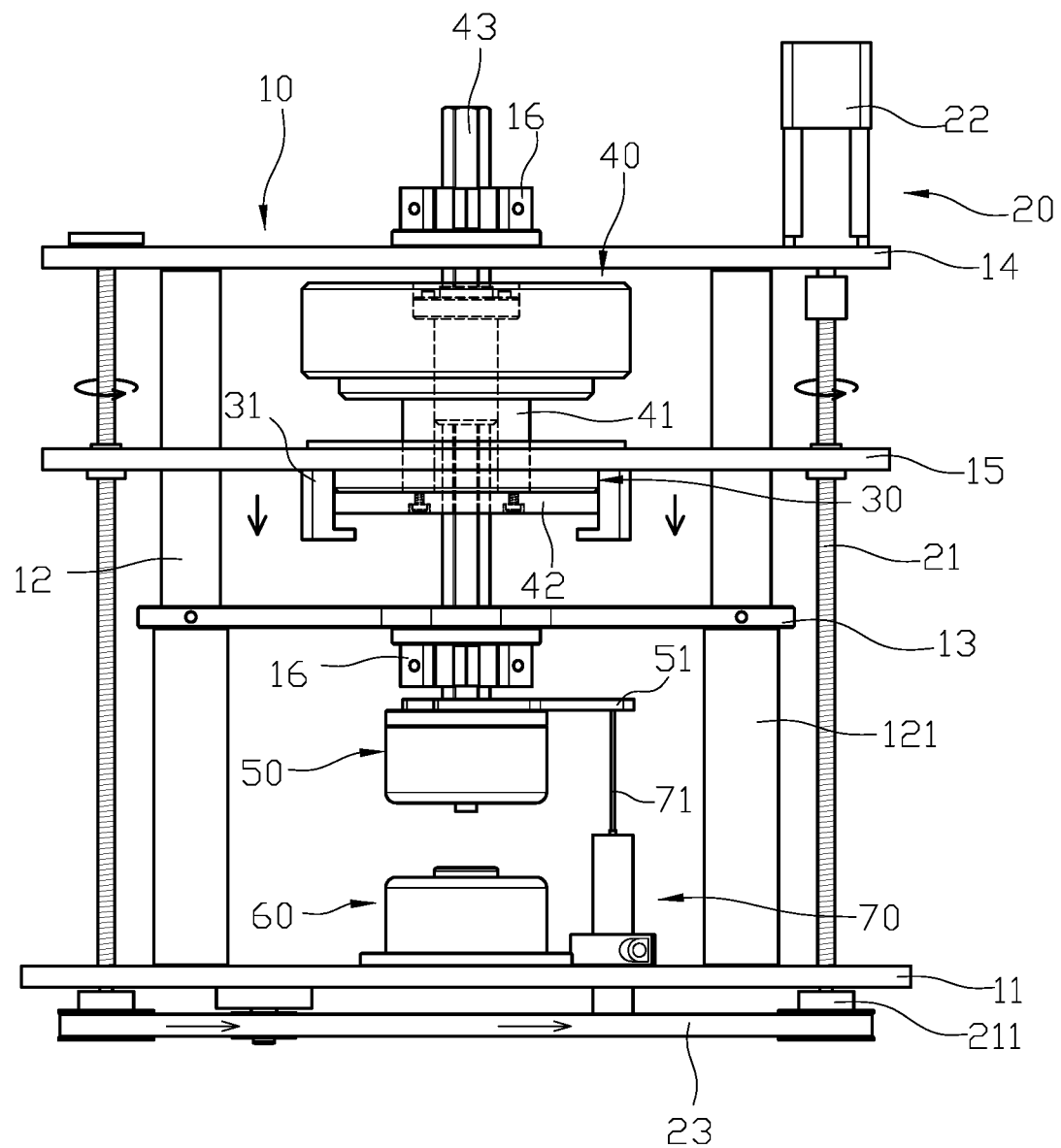
FIG. 2 is a schematic drawing showing a testing target disposed on the preferred embodiment of the present invention.

First, please refer to FIG. 1 and FIG. 2. A plastometer comprises: a main frame 10, a driving unit 20, an electromagnet 30, a loading dock 40, an upper mold 50, a lower mold 60 and a measuring unit 70. The main frame 10 has a bottom plate 11 with two supporting columns 12, and the supporting columns 12 are respectively provided with a positioning plate 13 and a top plate 14. The supporting columns 12 further respectively have a supporting section 121 for supporting the positioning plate 13. A lifting platform 15 is disposed between the positioning plate 13 and the top plate 14 and configured to move along the supporting columns 12 driven by the driving unit 20. The driving unit 20 further comprises two screws 21, a driving motor 22, and a transmission belt 23. The two screws 21 are symmetrically installed through the top plate 14 and the bottom plate 11 of the main frame 10 and connected to the lifting platform 15. The driving motor 22 is configured to drive the two screws 21, and the two screws 21 are coupled by the transmission belt 23 for synchronized rotation to lift the lifting platform 15 along the two supporting columns 12. The electromagnet 30 is secured to a bottom of the lifting platform 15 and moves with the lifting platform 15. The lifting platform 15 further comprises two L-shaped positioning frames 31 at two sides of the electromagnet 30. The loading dock 40 is disposed between the top plate 14 and the positioning plate 13 and connected to a connecting column 41 passing through the lifting platform 15 and the electromagnet 30 and mounted with a magnetic member 42. The magnetic member 42 is limited between the electromagnet 30 and the positioning frame 31. The loading dock 40 further comprising a vertical shaft 43 with an upper portion extending through the top plate 14 and a lower portion passing through the electromagnet 30, the magnetic member 42, and the positioning plate 13. The top plate 14 and the positioning plate 13 both have a stabilizer 16, and the two stabilizers 16 limit the vertical shaft 43, and the vertical shaft 43 is connected to the upper mold 50. The upper mold 50 further comprises a sensing handle 51, and the lower mold 60 is mounted on the bottom plate 11 of the main frame 10 corresponding to the upper mold 50. The measuring unit 70 is mounted on the bottom plate 11 corresponding to the sensing handle 51 and has a measuring rod 71 connected to the sensing handle 51.

The composition of the structure, please refer to FIGS. 1 and 2. The two screw 21 of the driving unit 20 are symmetrically pivoted on both sides of the main frame 10, passing through the bottom plate 11 and the top plate and capable of moving the lifting platform 15 by rotation. The driving motor 22 is mounted on the top plate 14 and linked with the screws 21. The bottom end of the screw 21 runs through the bottom plate 11 and provided with a transmission wheel 211, and the transmission belt 23 is looped around the both transmission wheels 211 to achieve synchronous operation. When the driving unit 20 is powered on, the two screws 21 can be driven simultaneously to move the lifting platform 15 along the two supporting columns 12, which drives the electromagnet 30. The loading dock 40 is between the top plate 14 and the lifting platform 15, and the upper half of the vertical shaft 43 extends out of the top plate 14 and limited and clamped by the stabilizer 16, and the lower half extends out the positioning plate 13 and is also limited and clamped by a stabilizer 16. Therefore, the vertical shaft 43 moves with the loading dock 40, while provides the longitudinal guiding effect of the loading dock 40, to improve the stability of the loading dock 40. The upper mold 50 is assembled at the bottom end of the vertical shaft 43 and the lower mold 60 is fixed on the bottom plate 11 corresponding to the upper mold 50, so that the upper mold 50, 60 can be brought together to achieve the measuring operation of the plastic. Furthermore, the lower mold 60 is provided with the measuring unit 70 having an extended measuring rod 71 making contact with a sensing rod 51 extending from a side of the upper mold 50, which is subjected to the measurement of the pressure of the upper mold 50.

Figure 3:
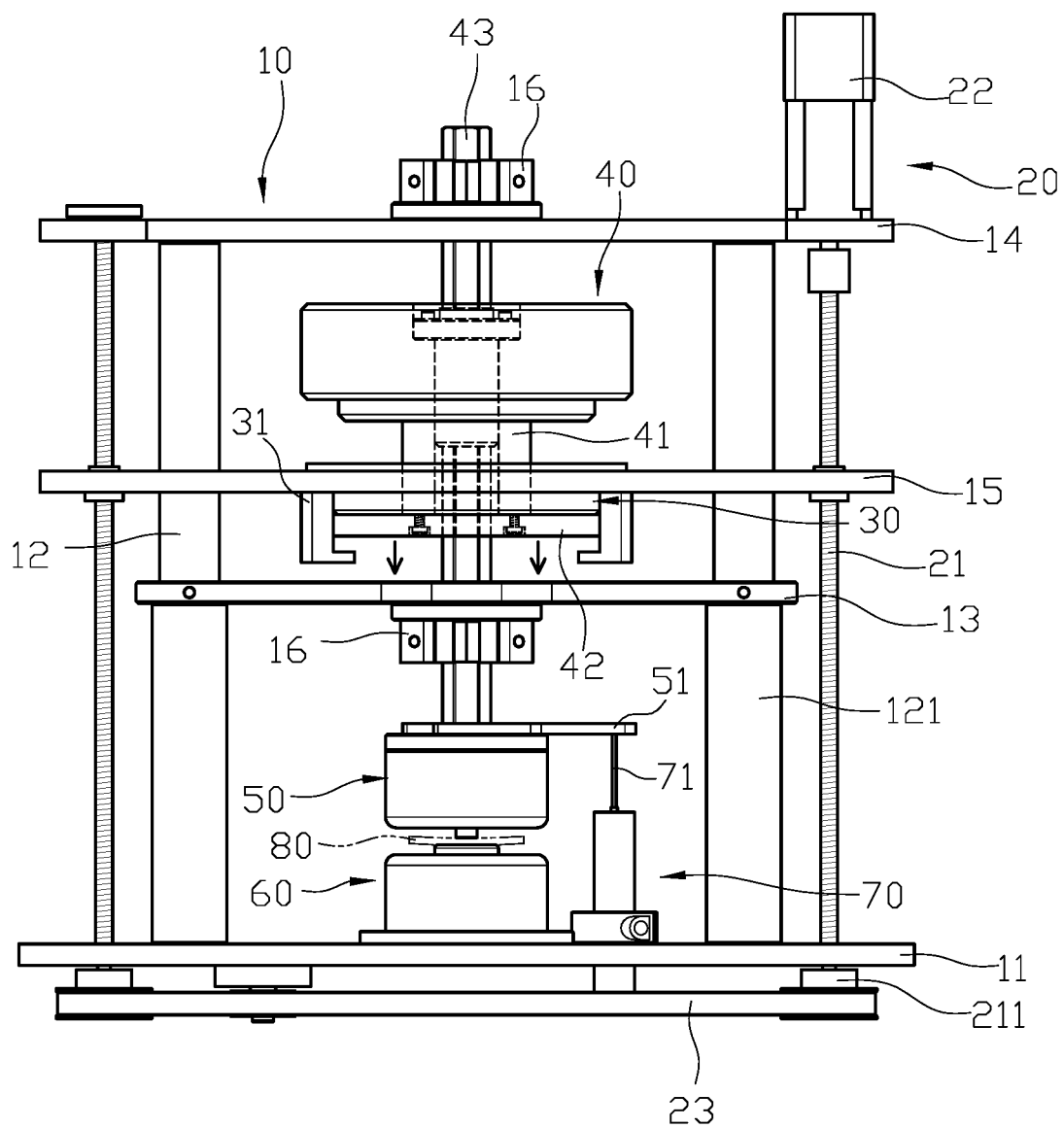
FIG. 3 is a schematic drawing showing the test target bring pressing by the preferred embodiment according to the present invention.
Figure 4:
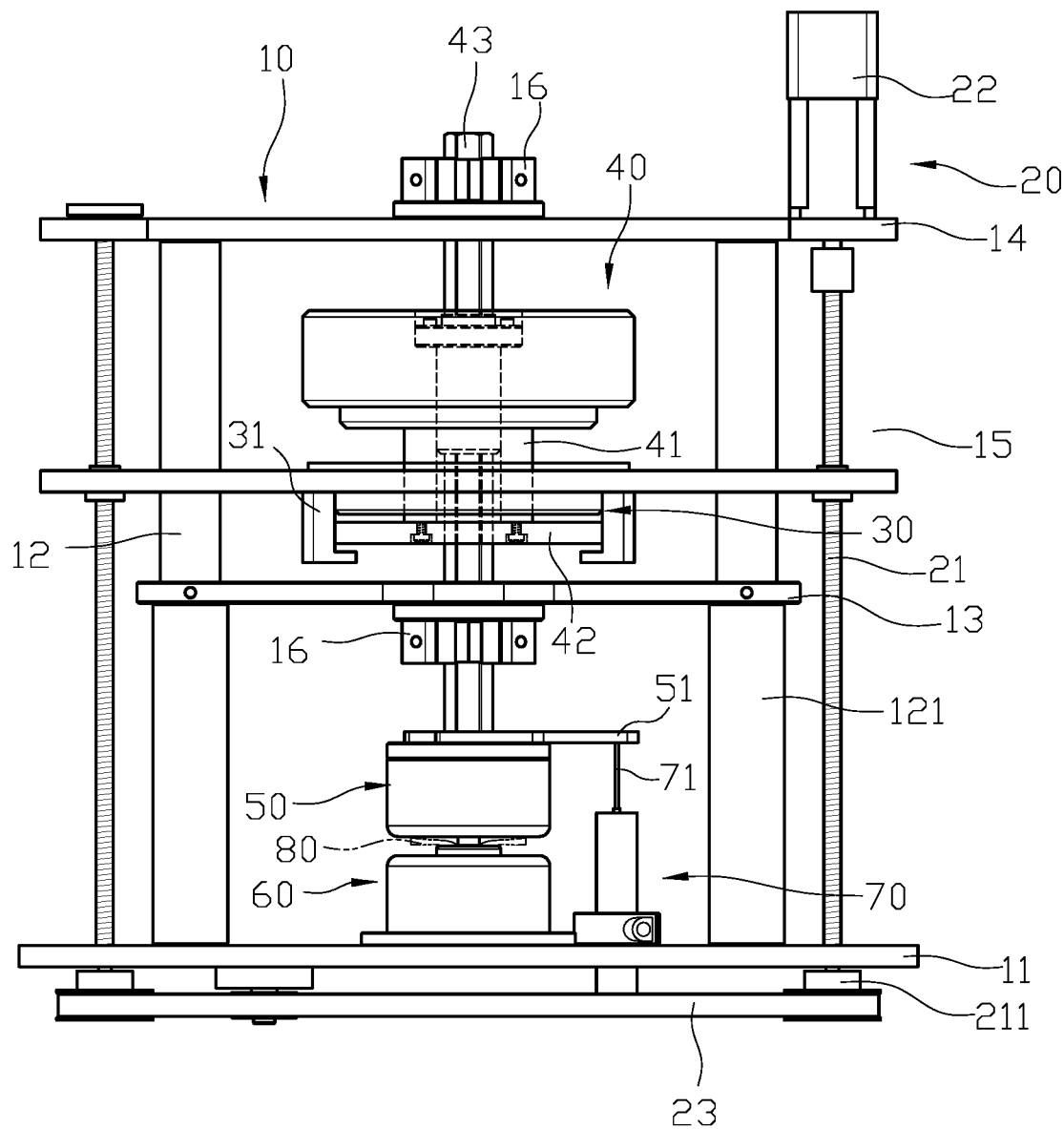
FIG. 4 is a schematic drawing showing the electromagnet controlling the loading dock to press again according to the present invention.

The actual measurement operation of the above-mentioned structure, please refer to the FIGS. 2, 3 and 4. First, the electromagnet 30 is first energize and magnetically attracts the magnetic member 42 of the loading dock 40 to make the loading dock 40, the vertical shaft 43 and the electromagnet 30 are magnetically integrated all as one piece, which can move synchronously with the lifting platform 15. When the test object 80 (such as rubber, plastic, such plastic materials) is placed at the center of the lower mold 60, the driving unit 20 can be started to control the lifting platform 15 to descend and make the upper mold 50 slightly contacting with the test object 80, the measuring rod 71 of the measuring unit 70 obtains a first pressing distance of the sensing handle 51. By following the international specification for plasticity measuring, the electromagnet releases the loading dock 40 to naturally sink down, the upper mold 50 is driven by the vertical shaft 43 to press down against the test object 80, after a few seconds, the measuring rod 71 of the measuring unit 70 senses a press distance of the sensing handle 51 to obtain the strength and compression of the test object 80 for accurate data measurement results.

Figure 5:
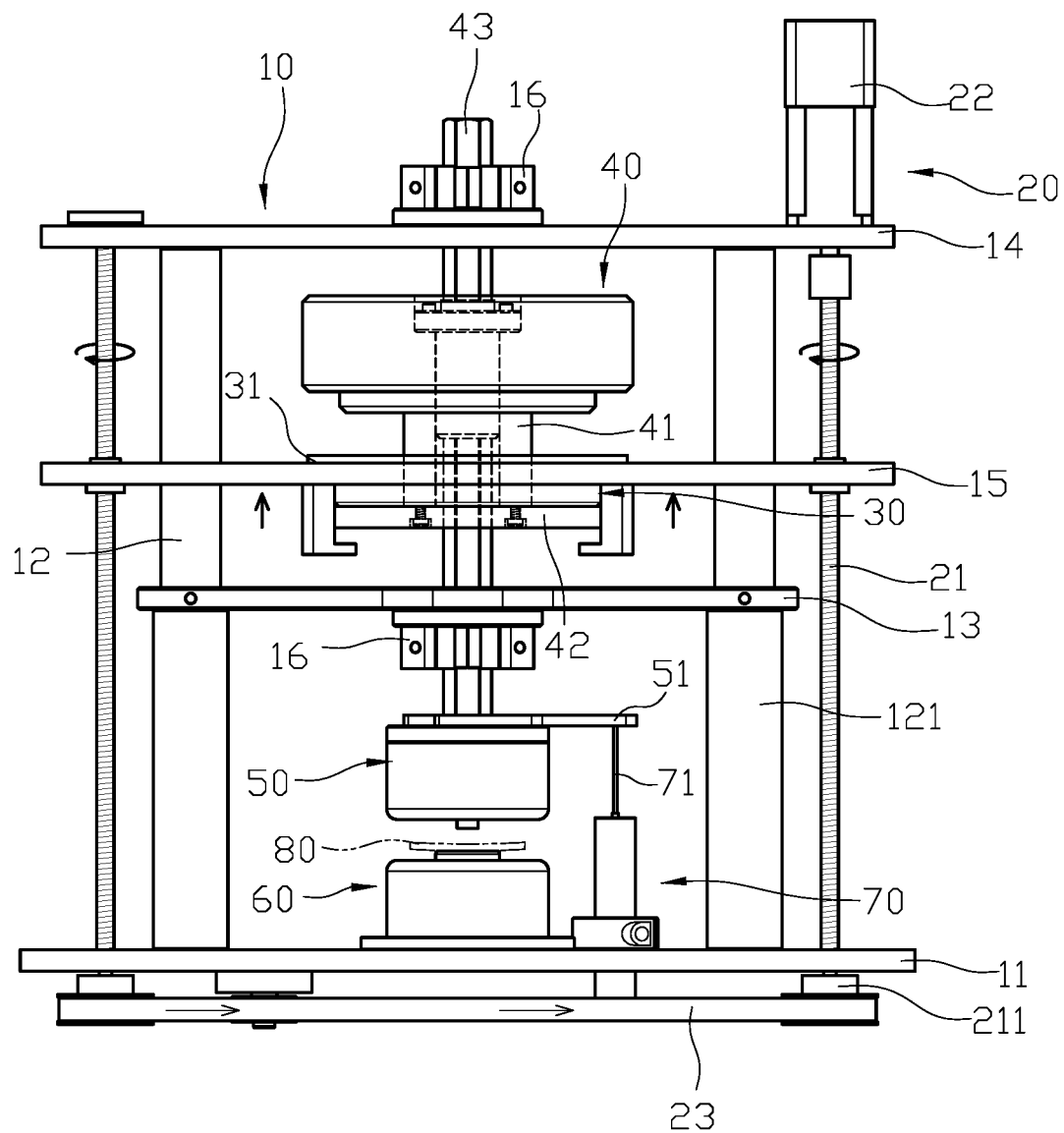
FIG. 5 is a schematic drawing showing the rise of the lifting platform after the measurement according to the present invention.

However, after the measurement, the electromagnet 30 re-attracts the magnetic member 42 upwards, as shown in FIG. 5, so that the loading dock 40 is integrated with the electromagnet 30, and finally the active driving unit 20 controls the lifting platform 15 to rise and separate the upper mold 50 from of the lower mold 60, for the next measurement operation.

With the structure of the above specific embodiment, the following benefits can be obtained: the driving unit 20 drives the lifting platform 15, so the lifting platform 15 makes a stable elevating displacement along the two supporting columns 12. Then, the electromagnet 30 attracts and controls the loading dock 40, so the pressure amount to be provided by the loading dock 40 for each test object 80 can be simply obtained, and the measurement operation is actually performed by the measuring unit 70 which can get accurate test results to improve the measurement efficiency of the relevant industry.

Although the present invention has been explained in relation to its preferred embodiment, it is to be understood that many other possible modifications and variations can be made without departing from the spirit and scope of invention as hereinafter claimed.

What is claimed is:

1. A plastometer comprising: a main frame, a driving unit, an electromagnet, a loading dock, a lower mold, an upper mold, and a measuring unit; the main frame having a bottom plate with a plurality of supporting columns, the supporting columns provided with a positioning plate and a top plate, a lifting platform disposed between the positioning plate and the top plate and configured to move along the supporting columns driven by the driving unit; the electromagnet secured to a bottom of the lifting platform and moving with the lifting platform; the loading dock disposed between the top plate and the positioning plate and connected to a connecting column passing through the lifting platform and the electromagnet and mounted with a magnetic member; the loading dock further comprising a vertical shaft with an upper portion extending through the top plate and a lower portion passing through the electromagnet, the magnetic member, and the positioning plate and attached to the upper mold at an end of the lower portion; the upper mold further comprising a sensing handle, the lower mold mounted on the bottom plate of the main frame corresponding to the upper mold; the measuring unit mounted on the bottom plate corresponding to the sensing handle and having a measuring rod connected to the sensing handle.

2. The plastometer as claimed in claim 1, wherein the supporting columns further respectively have a supporting section for supporting the positioning plate.

3. The plastometer as claimed in claim 1, wherein the top plate and the positioning plate both have a stabilizer, and the two stabilizers limit the vertical shaft.

4. The plastometer as claimed in claim 1, wherein the lifting platform further comprises two L-shaped positioning frames at two sides of the electromagnet.

5. The plastometer as claimed in claim 1, wherein the driving unit further comprises two screws, a driving motor, and a transmission belt, the two screws symmetrically installed through the top plate and the bottom plate of the main frame and connected to the lifting platform, the driving motor configured to drive the two screws, and the two screws are coupled by a transmission belt for synchronized rotation.

* * * * *